United States Patent [19]

Ohmori

[11] Patent Number: 4,901,157
[45] Date of Patent: Feb. 13, 1990

[54] LINE SCAN IMAGE SCANNER FOR USE WITH REFLECTIVE ORIGINALS AND TRANSPARENT FILMS

[75] Inventor: Seishi Ohmori, Tokyo, Japan

[73] Assignee: Eastman Kodak Company, Rochester, N.Y.

[21] Appl. No.: 229,538

[22] Filed: Aug. 8, 1988

[30] Foreign Application Priority Data

Sep. 30, 1987 [JP] Japan ................................ 62-246368

[51] Int. Cl.$^4$ ...................... H04N 1/024; H04N 1/040
[52] U.S. Cl. ..................................... 358/474; 358/494
[58] Field of Search ...................... 358/285, 293, 296

[56] References Cited

U.S. PATENT DOCUMENTS

| 4,571,636 | 2/1986 | Itoh | 358/293 |
| 4,620,234 | 10/1986 | Watanabe | 358/285 |
| 4,673,989 | 6/1987 | Yamada | 358/293 |
| 4,682,242 | 7/1987 | Sugita | 358/285 |
| 4,769,852 | 9/1988 | Hashimoto | 358/287 |

FOREIGN PATENT DOCUMENTS 0164713 12/1985 European Pat. Off. .

Primary Examiner—Howard W. Britton
Assistant Examiner—Jerome Grant, II
Attorney, Agent, or Firm—Raymond L. Owens

[57] ABSTRACT

A line scan image scanner in which when scanning originals a line of sensor elements is in a first position and when scanning film such sensor elements are moved to a second position.

1 Claim, 1 Drawing Sheet

LINE SCAN IMAGE SCANNER FOR USE WITH REFLECTIVE ORIGINALS AND TRANSPARENT FILMS

FIELD OF THE INVENTION

This invention relates to line scan image scanners.

BACKGROUND OF THE INVENTION

Currently an image scanner having a line scan image sensor also known as a linear sensor are used for input scanning of images of sheet-like reflective originals or documents. In this type of scanner, a linear image sensor moves along a path relative to the original and scans a line at a time. This type of scanner has the advantage that the volume of the total apparatus can be reduced because the optical system for transmitting images onto the sensor does not occupy a large space. Where transparent film is used, however, it is necessary to use an optical system which is different from the previously mentioned one utilized for reflective originals.

SUMMARY OF THE INVENTION

It is an object of this invention to provide a line scan image scanner for use with both reflective originals and transparent films.

In this invention, an image scanner includes a line scan image sensor is rotated, by about 90 degrees with respect to its position for reflective originals to a new position for transparent film. This new position enables an optical system to transmit light through transparent film to the line scan image sensor.

DESCRIPTION OF THE PREFERRED EMBODIMENT

Figure 1:
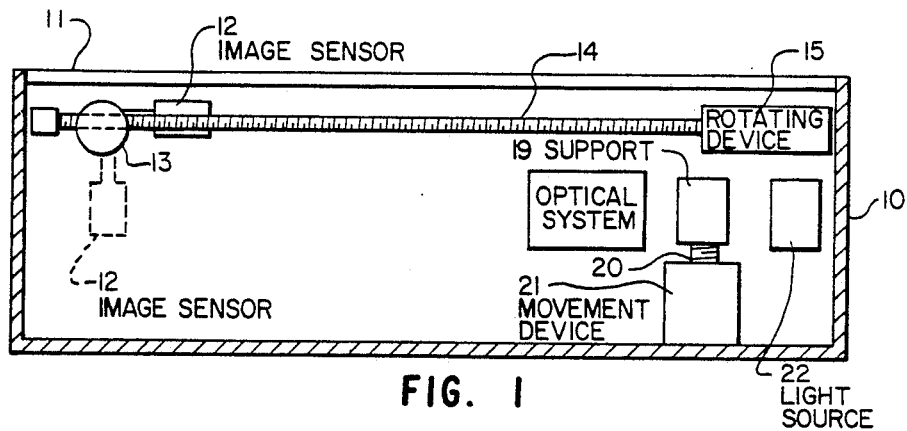
FIG. 1 is a sectional side view of an image scanner of this invention.
Figure 2:
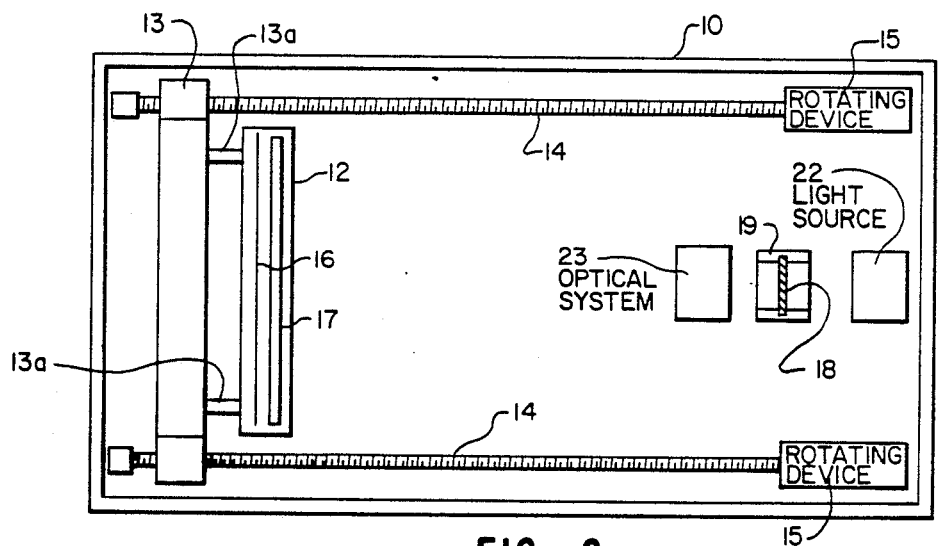
FIG. 2 is a plan view of the image scanner of FIG. 1.

In FIGS. 1 and 2, reference numeral 10 indicates a housing for the image scanner of this invention. A platen 11 composed of a transparent material such as glass is fixed to the top of the housing. Reflective originals, including pictures, are laid on the platen. A line scan image sensor 12 is mounted on a support device 13 in such a way as to be positioned close to the platen 11, the support device being designed to engage with threaded transfer shafts or lead screws 14. A transport device for moving the support device 13 comprises spaced threaded shafts 14 and rotating devices 15. The devices 15 are rotated by a common motor (not shown). The rotating threaded shafts 14 move the support device 13 longitudinally and the image sensor 12 along a path relative to an original on the platen 11.

The line scan image sensor 12 has a line of sensor elements or pixels 16 for receiving a line of information at a time of incoming light reflected from the original. A rod lens not shown, focuses light on the line of sensor elements 16. In this embodiment, the length of the line is substantially the same as the width of the effective area of the platen 11. It would be obvious, however, that the length of the line of sensors may be less than the width of such area with a reducing optical system. These sensors can be provided by CCD's (Charge Couples Devices). In addition, the image sensor is equipped with a light emission device 17. The light emitted from the emission device 17 reflects off of an original sheet disposed on the platen 11. A line of reflected light from the original passes into the image sensor and illuminates the line of sensor elements 16. In a conventional manner, a line of information is taken from the photoelectric transducers 16 and transformed into electrical output signals through the sensor elements. Output means such as leads, not shown, send such electrical output signals to a computer or the like so as to serve as data for forming images. This operation continues a line at a time as the image sensor 12 moves relative to the platen 11. Alternatively, the image sensor 12 can move intermittently, and the operation is effectuated every time the image sensor stops, until the scanning of the original sheet is completed.

The above mentioned structure and operation are known in the prior art.

In this invention, the image sensor 12 is rotatably carried on the support device 13. Arms 13a are pivotally mounted on the body of device 13 and carry the sensor 12. The sensor 12 can be rotated 90° downward from the position in its normal mode shown by a solid line in FIG. 1 to a second position shown by a broken line. In the first position, the line of sensor elements face the platen 11 and in the second position they face a film 18. This second position is about 90° apart from the platen 11. This rotating operation, is effectuated mechanically by employing power means controlled by a switch (not shown).

In accordance with this invention, a film support device 19 holds transparent film 18. Light from a fixed source 22 is projected by an optical system 23 such that light passes through the film 18 onto the line of sensor elements 16 of the image sensor 12. The optical system focuses the light that has been emitted from the source of light 22 and has passed through the film 18 on a point adjacent the line of sensor elements 16. The film support device 19 has a threaded shaft 20 secured thereto, the threaded shaft is adapted to engage with a nut (not shown) of a movement device 21 so that rotation of the nut enables the film support device 19 to move up and down. In this embodiment, the optical system 23 is designed to enlarge the image of the film. Scanning a line at a time of the film relative to the fixed light source 22 is accomplished by moving the film 18 fitted into the film support device 19 from top to bottom or in the reverse direction by means of the motor 21.

Figure 3:
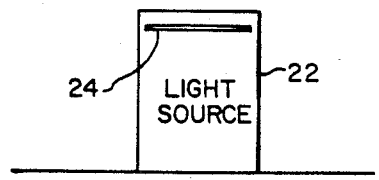
FIG. 3 is an elevation view of the source of light 22 of FIG. 1.

As shown in FIG. 3 the source of light 22 is formed so that it provides thin sheet-like rays of parallel light from slit 24. The slit 24 prevents stray light from being reflected off of surfaces (such as the platen). All the light transmitted through the slit 24 passes through the film and illuminates the image sensor. By means of this arrangement, scanning is accomplished with high accuracy.

As described above, in this invention the design of the image sensor is such that it rotates through about 90°. The direction of incidence of light on the image sensor is parallel to the platen in the film scanning mode, whereby the optical system required in this mode can be located along the platen. Thus, scanning of both reflective originals and transparent films can both be effectively accomplished in a relatively small space.

It is claimed:

1. A line scan image scanner comprising:

a platen onto which a reflective original is placed;

a line scan type image sensor having a line of sensor elements;

a support device for supporting the image sensor so that the image sensor is rotatable from a first position in which the line of sensor elements face the platen to a second position which is about 90° apart from the platen;

means for moving said support device relative to said platen so as to enable the image sensor to scan originals a line at a time;

a film support device for supporting transparent film;

a source of light;

an optical system for projecting light from the source through the film onto the image sensor when in its second position; and means for moving the film support device.

* * * * *